United States Patent [19]
Oya

[11] Patent Number: 6,024,001
[45] Date of Patent: Feb. 15, 2000

[54] METHOD OF TURNING WORKS AND LATHE FOR CARRYING OUT THE METHOD

[75] Inventor: Koichi Oya, Amagasaki, Japan

[73] Assignee: Dainichi Kinzoku Kogyo Kabushiki Kaisha, Amagasaki, Japan

[21] Appl. No.: 08/863,365

[22] Filed: May 27, 1997

[30] Foreign Application Priority Data

Jun. 4, 1996 [JP] Japan ................................. 8-141577

[51] Int. Cl.⁷ ....................................................... B23B 1/00
[52] U.S. Cl. .................................. 82/1.11; 82/129; 82/47; 82/138
[58] Field of Search ........................... 82/129, 1.11, 120, 82/121, 54, 56, 118, 117, 133, 138, 158, 159, 47

[56] References Cited

U.S. PATENT DOCUMENTS

| | | | |
|---|---|---|---|
| 4,881,309 | 11/1989 | Sansone . | |
| 5,058,029 | 10/1991 | Uemura | 82/120 X |
| 5,127,140 | 7/1992 | Oiwa et al. . | |
| 5,152,201 | 10/1992 | Izawa | 82/1.11 |
| 5,471,900 | 12/1995 | Corwin et al. | 82/129 X |
| 5,513,932 | 5/1996 | Asada | 82/1.11 X |

FOREIGN PATENT DOCUMENTS

| | | | |
|---|---|---|---|
| 2413160 | 8/1979 | France | 82/129 |
| 54-83089 | 6/1979 | Japan . | |
| 57-168802 | 10/1982 | Japan . | |
| 58-56701 | 4/1983 | Japan . | |
| 3035903 | 2/1991 | Japan . | |
| 7185901 | 7/1995 | Japan . | |
| 1650374 | 5/1991 | U.S.S.R. | 82/129 |
| 2159450 | 12/1985 | United Kingdom . | |

OTHER PUBLICATIONS

Copy of Japanese Office Action.

*Primary Examiner*—Andrea L. Pitts
*Assistant Examiner*—Henry W. H. Tsai
*Attorney, Agent, or Firm*—Dennison, Meserole, Scheiner & Schultz

[57] ABSTRACT

A method is provided for turning a first work and a second work held on a first spindle and a second spindle, respectively. The first spindle and the second spindle are positioned on the same axis and confronting each other, so that the first work and the second work are rotated about the same axis. A tool rest is provided with a first tool and a second tool and is moved for turning the first work by the first tool. The second spindle is moved in synchronism with the movement of the tool rest for turning the second work by the second tool.

4 Claims, 4 Drawing Sheets

METHOD OF TURNING WORKS AND LATHE FOR CARRYING OUT THE METHOD

BACKGROUND OF THE INVENTION

1. Field of the Invention

The present invention relates to a method of turning workpieces and a lathe for carrying out the method.

2. Description of the Prior Art

There has been proposed a numerically controlled lathe (NC lathe) having two spindles or a first and a second spindle and having a first and a second tool rest which cooperate with the first and the second spindle, respectively, and which are controlled in their movement independently of each other. However, with this conventional NC lathe, in order to control the movement of the tool rests independently of each other, a controller must have an intricate control program. In addition, functions and effects which may be expected by the conventional lathe are merely those of based on the combination of two lathes into one lathe.

SUMMARY OF THE INVENTION

It is, accordingly, an object of the present invention to provide a method of turning workpieces which employs a simple program for controlling the movement of a tool rest while the function of a lathe having two spindles is fulfilled at the maximum.

It is another object of the present invention to provide a method of turning workpieces which enables a turning operation to be efficiently performed.

It is a further object of the present invention to provide a lathe for performing such a method.

According to a first aspect of the present invention, there is provided a method of turning workpieces, comprising the steps of:

holding a first workpiece and a second work on a first spindle and a second spindle, respectively, the first spindle and the second spindle being arranged on a common axis and confronting each other;

rotating the first work and the second workpiece about the axis;

providing a first tool and a second tool on a tool rest;

moving the tool rest for turning the first workpiece by said first tool; and moving the second spindle in synchronism with the movement of the tool rest and turning the second workpiece by the second tool.

With this method, the tool rest is required only to be moved for turning the first workpiece held by the first spindle, and the second workpiece held by the second spindle is turned in synchronism with the turning operation of the first workpiece by the movement of the second spindle to follow the movement of the tool rest. Thus, the first and the second workpieces can be turned simultaneously without using an intricate program as required in the conventional method in which two tool rests are controlled in their movement. The turning operation can therefore be performed efficiently while utilizing at the maximum the function of such a lathe having two spindles.

According to a second aspect of the present invention, there is provided a method of turning workpieces, comprising the steps of:

a) providing a first spindle and a second spindle positioned on an axis and confronting each other;

b) holding a workpiece on a first spindle;

c) providing a first and a second tool on a tool rest;

d) rotating the first spindle to turn one end of the workpiece by the first tool in a first turning mode;

e) feeding the workpiece toward the second spindle along the axis of the first spindle;

f) holding the workpiece on both the first and the second spindles and cutting off the workpieces at a predetermined position between the first and the second spindles, so that the remaining part of the workpiece is held on the first spindle as a first workpiece and that a cut part of the workpiece is held on the second spindle as a second workpiece;

g) rotating the first spindle and moving the tool rest to turn one end of the first workpiece by the first tool in a second turning mode;

h) rotating the second spindle and moving the second spindle in synchronism with the movement of the tool rest to turn the second workpiece by the second tool in the second turning mode, so that the second workpiece has both ends turned in the first turning mode and in the second turning mode, respectively;

i) removing the second workpiece from the second spindle;

j) again performing the steps e) to i) with the second turning mode in the steps g) and h) replaced by the first turning mode; and k) repeatedly performing the steps e) to j).

With this method, both ends of the cut part or the second workpiece are turned in the first turning mode and the second turning mode, respectively, so as to form a product, and a plural number of such products can therefore be manufactured one after another in an unattended manner.

According to a third aspect of the present invention, there is provided a lathe comprising:

a first spindle adapted for holding a first workpiece and rotatable about a Y axis;

a second spindle disposed on the Y axis to confront said first spindle and adapted for holding a second workpiece, said second spindle being rotatable about the Y axis and movable along the Y axis; and a tool rest having a first tool and a second tool mounted thereon for cooperation with the first spindle and said second spindle, respectively, both the first and the second tools being movable along a Z axis parallel to the Y axis and being movable along an X axis perpendicular to the Y axis;

the second spindle being movable along the Y axis as the tool rest is moved along the Z axis, so that the turning operation of the first workpiece held on the first spindle and the turning operation of the second workpiece held on the second spindle can be simultaneously performed.

With this construction, the control of movement of the tool rest in the X and Y axis directions is performed with respect to the first workpiece on the side of the first spindle, and the turning operation of the second workpiece held on the second spindle is performed by moving the second spindle to follow the movement of the tool rest. Therefore, both the first and the second workpieces held on the first and the second spindles can be turned simultaneously without using an intricate control program as required in the conventional lathe for moving two tool rests, so that the function of the lathe having two spindles can be brought out at the maximum.

In a preferred embodiment, the second spindle is moved along the Y axis at a speed twice the moving speed of the tool rest along the Y axis.

With this construction, the first workpiece held on the first spindle and the second workpiece held on the second spindle can be performed simultaneously to have configurations symmetrical with each other. Thus, when the moving speed of the workpiece along the Z axis in a Z axis minus direction (direction to move away from the first spindle) is V, the second spindle is moved along the Y axis in a Y axis minus direction (direction to move away from the first spindle) at a speed of 2V. The speed of movement of the tool rest relative to the second workpiece held on the second spindle is therefore given by V−2V=−V. This means that the tool rest is moved relative to the second workpiece held on the second spindle at a speed of V in a Z axis plus direction (direction opposite to the Z axis minus direction). As the result, the first and the second workpieces are turned simultaneously to have configurations symmetrical with each other.

In addition, since one tool rest is used for turning two workpieces, a program for controlling the movement of the tool rest is not intricate while the function of such a lathe having two spindles can be fulfilled at the maximum.

The tool rest may further include a cutting off tool for cutting off the first workpiece by rotating the first and the second spindles with the first workpiece held on both the first and the second spindles.

With this construction, by incorporating a workpiece feeding device which is associated with the first spindle for automatically feeding the first workpiece (elongated work) to the first spindle, the first workpiece held on the first spindle and having one end turned by the first tool is fed to be also held by the second spindle at its one end, and the first workpiece can be cut off at a predetermined length by the cutting off tool by rotating the first and the second spindles in the same direction at the same speed. The cut part of the first workpiece is kept to be held on the second spindle as the second workpiece, and the cut part of the work or the second work is then turned by the second tool simultaneously with the turning operation of the remaining part of the first workpiece held on the first spindle by the first tool. Thus, the turning operation of both ends of the second workpiece can be performed in a continuous manner.

In brief, the first workpiece held on the first spindle is turned at its one end and is thereafter cut off by a suitable length, so that a part of the workpiece is cut off from the workpiece as the second work and is transferred from the first spindle to the second spindle. With this condition, the other end of the cut part or the second workpiece can be turned simultaneously with the turning operation of one end of the remaining workpiece held on the first spindle. The second workpiece having both ends turned or a product is then removed from the second spindle. By repeatedly performing this process, a plural number of the products each having both ends turned can be manufactured one after another while the turning operation is performed simultaneously at the first and the second spindles.

The invention will become more fully apparent from the claims and the description as it proceeds in connection with the drawings.

DETAILED DESCRIPTION OF THE PREFERRED EMBODIMENT

An embodiment of the present invention will now be described with reference to the drawings.

Figure 1:
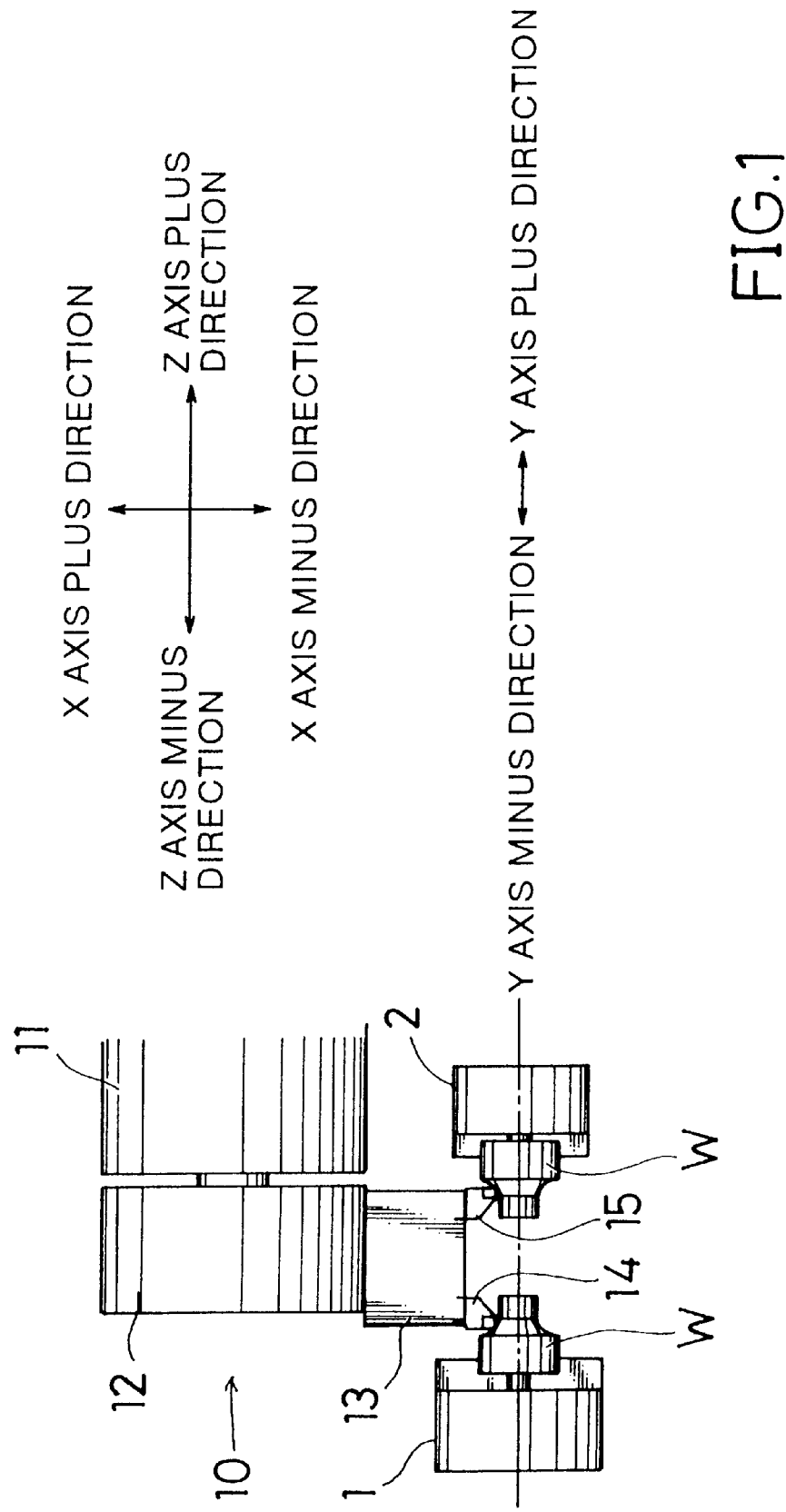
FIG. 1 is a schematic front view of the essential parts of a lathe according to an embodiment of the present invention.

A lathe is shown in schematic view in FIG. 1 and includes a first spindle 1 and a second spindle 2 mounted on a bed (not shown). The first and the second spindles 1 and 2 are positioned on the left side and the right side, respectively, and are arranged on the same axis, so that the first and the second spindles 1 and 2 confront each other in the right and left directions as viewed in FIG. 1. The lathe further includes a tool rest 10 supported on the bed. As will be explained later, the lathe of this embodiment is characterized in that one tool rest 10 can be used in common for simultaneously turning two workpieces W.

The first spindle 1 positioned on the left side has a chuck device (not shown) and is rotatable about its axis with the workpiece W held by the chuck device. In this embodiment, the workpiece W has an elongate configuration. Although not shown in the drawings, a workpiece feeding device having a conventional construction is associated with the first spindle 1 and is operable to automatically feed the workpiece W from the left side of the first spindle 1 to the right side thereof along the axis of the spindle 1. The construction of the spindle 1 itself is well known in the art, and the detailed description of the spindle 1 is omitted.

The second spindle 2 positioned on the right side and confronting the first spindle 1 also has a chuck device similar to the chuck device of the first spindle 1, so that the second spindle 2 is rotatable about the same axis as the first spindle 1 with the workpiece W held by the chuck device. The axis of the first spindle 1 or the axis of the second spindle 2 will be hereinafter called "Y axis". Thus, the workpieces W held on the first and second spindles 1 and 2, respectively, are rotated about the Y axis.

The second spindle 2 is supported on the bed such that the second spindle 2 is movable along the Y axis. A drive mechanism (not shown) which mainly comprises a servo motor and a ball screw is provided for moving the second spindle 2 along the Y axis. The direction of movement of the second spindle 2 as well as the moving speed thereof is numerically controlled by controlling the servo motor based on a control program stored in a controller (not shown). For explanation purpose, a direction toward the first spindle 1 and a direction away from the first spindle 1 are hereinafter called "Y axis minus direction" and "Y axis plus direction", respectively. The first spindle 1 is fixed in position relative to the bed in the direction of Y axis.

The tool rest 10 mainly comprises a body 11 and a turret 12. The body 11 is movable in the vertical direction as well as in right and left directions relative to the bed as viewed in FIG. 1. The turret 12 has a number of different kinds of tools mounted on its circumferential surface and is indexable in desired positions in the circumferential direction so as to perform plural kinds of turning operations in combination using different tools. A drive device is provided for moving the body 11 and mainly comprises two servo motors and their related ball screws. One set of the servo motor and the ball screw is adapted for movement in the vertical direction, and the other set is adapted for movement in the right and left directions. The servo motors are controlled independently of each other by the control device described above.

For explanation purpose, the right or left direction of movement of the body 11 of the tool rest 10 is hereinafter called "Z axis direction", and the vertical direction of movement of the body 11 is hereinafter called "X axis direction". Thus, as the body 11 is moved in the Z axis direction, the indexed tool is fed in the longitudinal direction of the workpiece W. As the body 11 is moved in the X axis direction, the indexed tool is fed in the diametrical direction of the workpieces W so as to cut the same in the depthwise direction. For also explanation purpose, a direction along the Z axis toward the first spindle 1 (left direction as viewed in FIG. 1) and a direction along the Z axis away from the first spindle 1 (right direction as viewed in FIG. 1) are hereinafter called "Z axis minus direction" and "Z axis plus direction", respectively. For the same purpose, a direction along the X axis toward the Y-axis (downward direction as viewed in FIG. 1) and a direction along the X axis away from the Y axis (upward direction as viewed in FIG. 1) are hereinafter called "X axis minus direction" and "X axis plus direction", respectively.

The tools provided on the turret 12 of the tool rest 10 include a pair of a first tool 14 and a second tool 15 which are mounted on the turret 12 by means of a tool holder 13 and are positioned at one of the indexable positions of the turret 12. The first tool 14 positioned on the left side as viewed in FIG. 1 is adapted to turn the workpiece W held on the first spindle 1, and the second tool 15 positioned on the right side as viewed in FIG. 1 is adapted to turn the workpiece W held on the second spindle 2. The second tool 15 as well as the first tool 14 is conventional in its construction and will not be explained in detail.

The control device is programmed such that the moving speed of the second spindle 2 in the Y axis minus direction is twice the moving speed of the body 11 of the tool rest 10 in the Z axis minus direction.

The lathe described above is operable to simultaneously turn two workpieces W, and a method of turning of the works W will now be explained according to the sequential steps of the method.

Figure 3A:
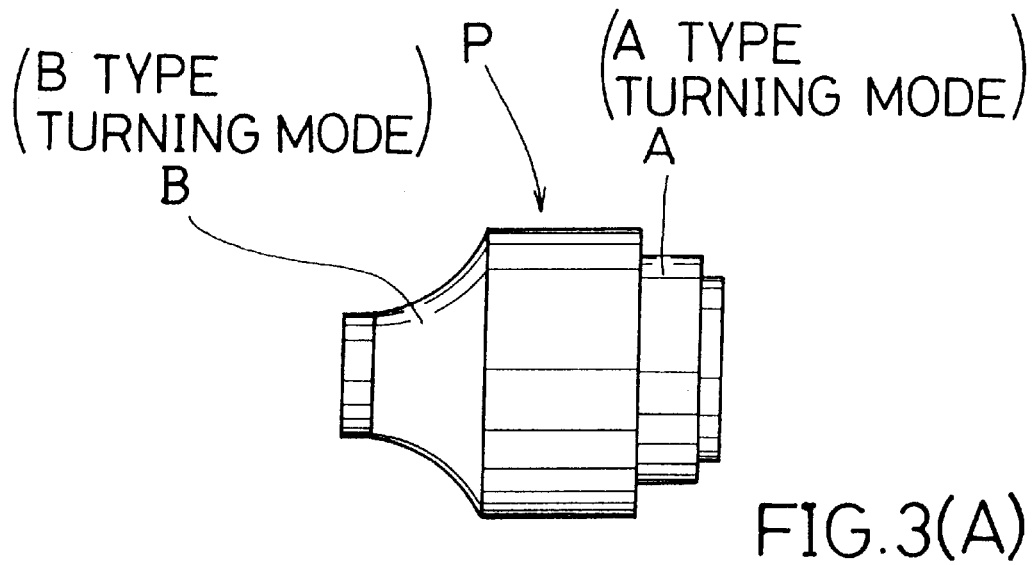
FIG. 3(A) is a side view of a completed product.

It will be noted that, with the method of this embodiment, a product P shown in FIG. 3(A) can be obtained. The product P has both ends turned in different turning modes. Thus, the right side end is turned to have a stepped portion, and the turning mode of this right side end is hereinafter called "A-type turning mode". On the other hand, the left side end is turned to have a substantially conical configuration, and the turning mode of this left side end is hereinafter called "B-type turning mode".

First, the right side end of the workpiece W is turned in the A-type mode with the workpiece W held on the first spindle 1. At this stage, the second spindle 2 is not used for the turning purpose, and only the first spindle 1 is used. According to a predetermined program stored in the control device, the body 11 of the tool rest 10 is moved in both X axis and Z axis directions, so that the right side end of the workpiece is turned to have the stepped configuration.

After the turning operation in the A-type mode has been completed, the second spindle 2 is moved in the Y axis minus direction, and then the right side end of the workpiece W turned in the A-type mode is held on the second spindle 2.

Figure 3B:
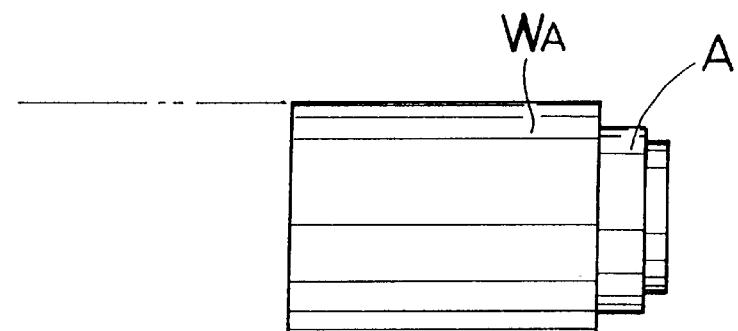
FIG. 3(B) is a side view of a workpiece completed on a first side.

The first spindle 1 and the second spindle 2 is thereafter rotated in the same direction at the same rotational speed so as to cut off the workpiece W at a predetermined position in its longitudinal direction. In order to perform this cutting off operation, the turret 12 of the tool rest 10 is rotated to index a cutting off tool 16 in a predetermined position. For discrimination purpose, a part of the workpiece W which was turned only in the A-type mode and which was cut off from the workpiece W is hereinafter called "workpiece WA". The workpiece WA is shown in FIG. 3. (B).

After the cutting off operation, the second spindle 2 is moved in the Y axis plus direction to return to its original position with the workpiece WA held on the second spindle 2. Concurrently therewith, the workpiece feeding device associated with the first spindle 1 pushes the workpiece W by a predetermined distance so as to feed the workpiece W in the Y axis plus direction. In order to permit such feeding of the workpiece W, the chuck device of the first spindle 1 is operated to once release the workpiece W and to again hold the same.

At this stage, the workpiece W with both ends being not turned is held on the first spindle 1 and, the workpiece WA having one end turned in the A-type mode is held on the second spindle 2. More specifically, the workpiece WA is held on the second spindle 2 with its left side end protruding toward the first spindle 1. With this arrangement, the workpiece W and the workpiece WA held on the first spindle 1 and the second spindle 2, respectively, are turned simultaneously. FIGS. 2(A) to 2(F) show the process of such simultaneous turning operation.

Figure 2A:
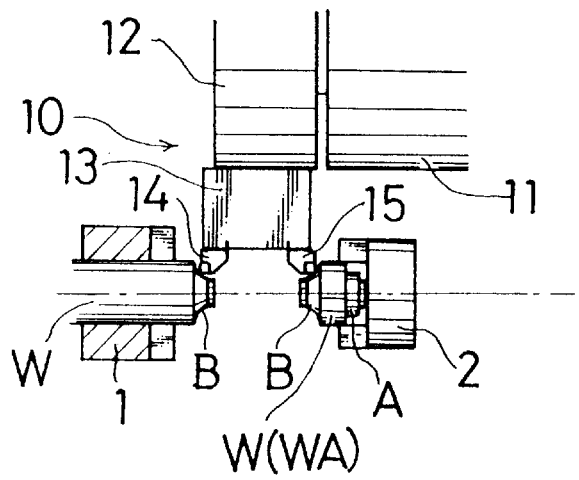
FIG. 2(A) shows how workpieces are held on the spindles of the lathe.

First, as shown in FIG. 2(A), the right side end of the workpiece W held on the first spindle 1 and the left side end of the workpiece WA held on the second spindle 2 are turned in the B-type mode, respectively, while the tool rest 10 is moved in the X axis minus direction and in the Z axis minus direction according to the predetermined program. More specifically, the workpiece W on the side of the first spindle 1 is turned by the first tool 14, and the workpiece WA on the side of the second spindle 2 is turned by the second tool 15.

During this step, the second spindle 2 is moved in the Y axis minus direction at a speed twice the moving speed of the tool rest 10 in the Z axis minus direction. By this determination, the moving speed of the first tool 14 relative to the workpiece W on the side of the first spindle 1 and the moving speed of the second tool 15 relative to the workpiece WA on the side of the second spindle 2 are equal to each other although their moving directions are opposite to each other. Thus, the first tool 14 is moved in the Z axis minus direction relative to the workpiece W on the side of the first spindle 1, and the second tool 15 is moved in the Z axis plus direction relative to the workpiece WA on the side of the second spindle 2. As the result, the right side end of the workpiece W on the side of the first spindle 1 and the left side end of the workpiece WA on the side of the second spindle 2 are turned simultaneously in the B-type mode to have configurations which are symmetrical with each other in right and left directions.

Figure 2B:
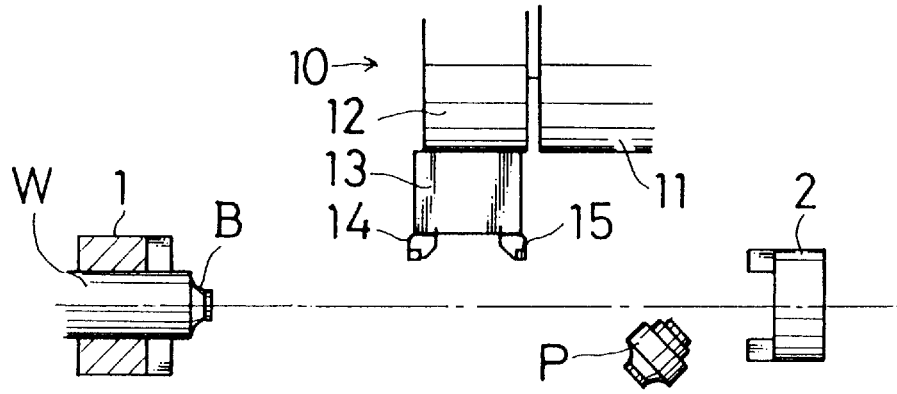
FIGS. 2(B) to 2(F) show workpieces during a cycle of progressive steps of a turning process.

After the turning operation in the B-type mode has been completed, the second spindle 2 is moved to its original position in the Y axis direction as shown in FIG. 2(B). The workpiece WA having both ends turned in the A-type mode and in the B-type mode, respectively, or a product P is then released from the second spindle 2 and is ejected from the lathe.

Figure 2C:
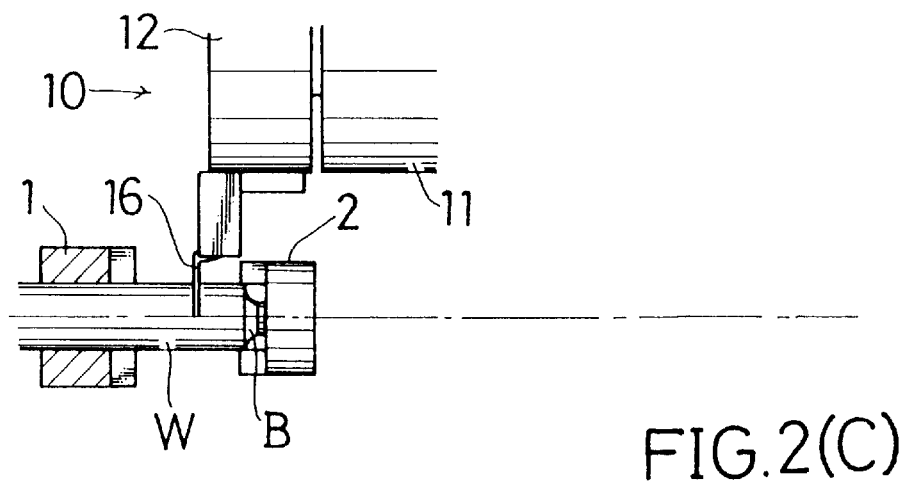

The workpiece W having one end turned in the B-type mode is then released from the first spindle 1 and is pushed to be fed by the predetermined distance in the Y axis plus direction. The workpiece W is then again held on the first spindle 2. On the other hand, the second spindle 2 is moved in the Y axis minus direction and the right side end of the workpiece W is held by the second spindle 2 as shown in FIG. 2(C). The first spindle 1 and the second spindle 2 are then rotated in the same direction at the same speed.

Figure 3C:
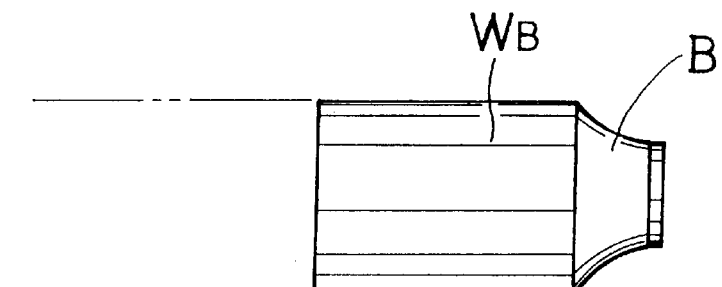
FIG. 3(C) is a side view of a workpiece completed on a second side.

Concurrently therewith, the turret 12 of the tool rest 10 is rotated to index the cutting off tool 16 to the working position, and the tool rest 10 is moved in the Z axis minus direction, so that the cutting off tool 16 is set to a position which is spaced from the right side end of the workpiece W by the predetermined distance. The tool rest 10 is then moved in the X axis minus direction, so that the workpiece W is cut off. For discrimination purpose, a part of the work W which was turned only in the B-type mode and which was cut off from the workpiece W is hereinafter called "workpiece WB". The workpiece WB is best shown in FIG. 3(C). Thus, at this stage, the workpiece W with the right side end being not turned is held on the first spindle 1, and the workpiece WB is held on the second spindle 2.

Figure 2D:
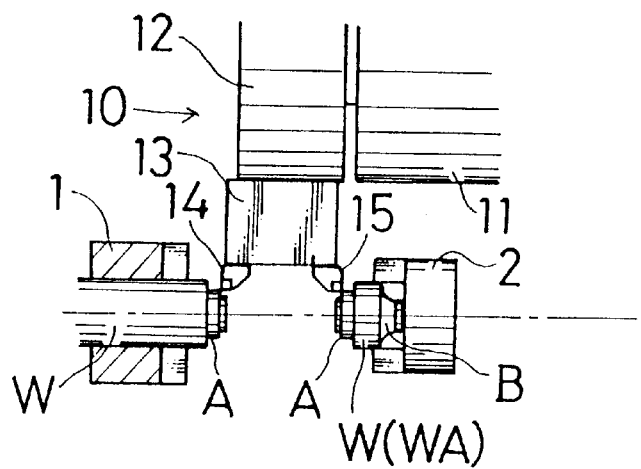

Thereafter, as shown in FIG. 2(D), the tool rest 10 is again moved in the X axis minus direction and in the Z axis minus direction according to the predetermined program with the turret 12 rotated to index the first cutting tool 14 and the second cutting tool 15 to the working position, so that the workpiece W on the side of the first spindle 1 and the workpiece WB on the side of the second spindle 2 are turned simultaneously in the A-type turning mode.

During this step, in the same manner as the turning operation in the B-type mode, the second spindle 2 is moved in the Y axis minus direction at a speed twice the moving speed of the tool rest 10 in the Z axis minus direction, so that the right side end of the workpiece W held on the fist spindle 1 and the left side end of the workpiece WB held on the second spindle 2 are turned simultaneously in the A-type mode to have configurations symmetrical with each other.

Figure 2E:
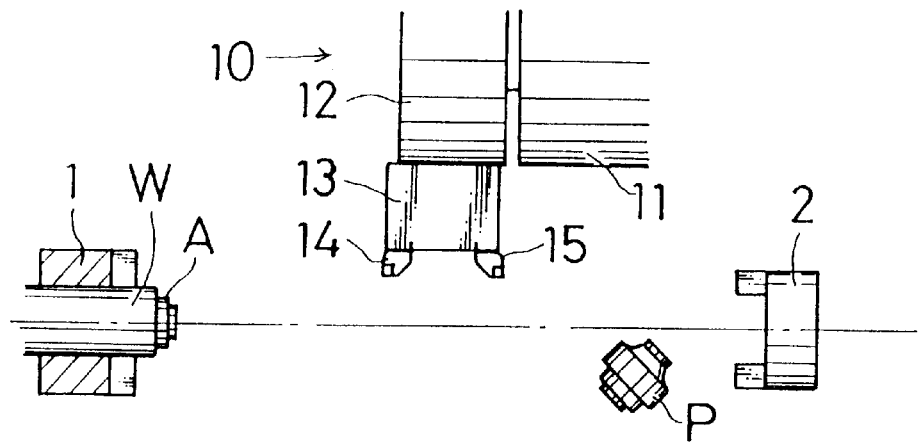

With this turning operation in the A-type mode, a product P having both ends turned in the A-type mode and in the B-type mode, respectively, can be obtained at the second spindle 2. The second spindle 2 is then moved to its original position in the Y axis direction, and the product P is ejected from the lathe as shown in FIG. 2(E). This product P ejected after the turning operation in the A-type mode has the same configuration as that ejected after the turning operation in the B-type mode in the step shown in FIG. 2(B).

At this stage, the workpiece W having the left side end turned in the A-type mode is held on the first spindle 1. Therefore, in the same manner as described above, the workpiece W is once released from the first spindle 1 and is again held thereon after the workpiece W is fed by the predetermined distance. The second spindle 2 is thereafter moved in the Y axis minus direction so as to hold the right side end of the workpiece W.

Figure 2F:
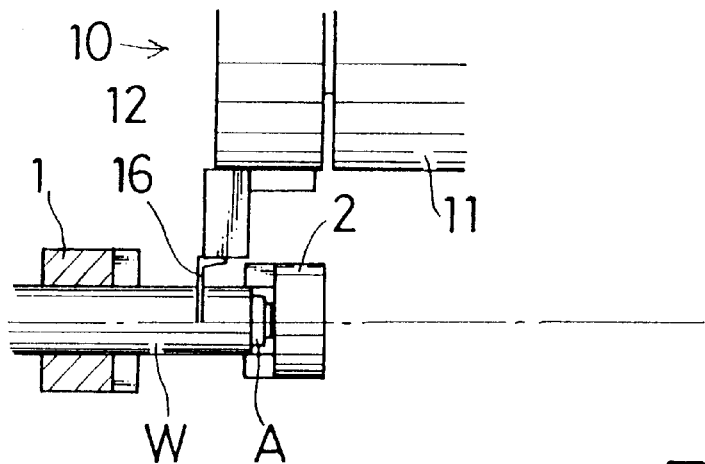

The first spindle 1 and the second spindle 2 are then rotated in the same direction at the same speed, and the tool rest 10 with the cutting off tool 16 indexed to the working position in place of the first and the second cutting tools 14 and 15 is moved in the Z axis minus direction to be set at the predetermined position spaced from the right side end of the workpiece W by the predetermined distance. The tool rest 10 is then moved in the X axis minus direction to cut off the workpiece W as shown in FIG. 2(F), so that the work WA cut off from the workpiece W and having the right side end turned in the A-type mode is obtained. At this stage, the workpiece WA is held on the second spindle 2, and the workpiece W with its right side end being not turned is held on the first spindle 1. This situation is the same as the step before the step shown in FIG. 2(A), and the products P each having both ends turned in the A-type mode and in the B-type mode, respectively, can be manufactured one after another by repeatedly performing the same steps described above.

Thus, the method of turning of this embodiment utilizes the lathe having the first and the second spindles 1 and 2 and one tool rest 10, and the workpiece W held on the first spindle 1 and the workpiece WA or WB held on the second spindle 2 can be simultaneously tuned in the same turning mode to have the configurations symmetrical with each other by moving the second spindle 2 in the Y axis minus direction at the speed twice the moving speed of the body 11 of the tool rest 10 in the Z axis minus direction.

The control of movement of the tool rest 10 is required only in connection with the first spindle 1 since the turning operation of the workpiece WA or WB held on the second spindle 2 is performed by moving the second spindle 2 in the Y axis minus direction relative to the tool rest 10 correspondingly. For this reason, the program for controlling the movement of the tool rest 10 of this embodiment is simple in comparison with the conventional program for controlling the movement of two tool rests independently of each other, while, with this embodiment, the function of the lathe having two spindles or the first and the second spindles 1 and 2 can be fulfilled at the maximum.

As described above, in the above embodiment, the work feeding device is associated with the first spindle 1, so that the workpiece W held on the first spindle 1 is always in the elongate form. After one end of the workpiece W has been turned in either of the A-type mode or the B-type mode, the workpiece W is cut off at a suitable position with the first and the second spindles 1 and 2 rotated in the same direction at the same speed. During the cutting operation, the workpiece W is kept to be held on the first spindle 1 while one side of the workpiece W having the turned end is held on the second spindle 2. As the result of this cutting operation, the cut off part of the workpiece W or the workpiece WA(WB) is transferred to the second spindle 2, while the workpiece W with one end being not turned is held on the first spindle 1. The second spindle 2 is then moved in the Y axis direction as described above, and the turning operation is performed for the workpiece WA(WB) simultaneously with the turning operation for the workpiece W on the first spindle 1, so that the turning operation of both ends of the workpiece WA(WB) can be performed in a continuous manner.

In brief, with this embodiment, one end of the workpiece W is turned at the first spindle 1, and the workpiece W is then cut to obtain the workpiece WA(WB) which has a suitable length and which has been transferred from the first spindle 1 to the second spindle 2. Thereafter, the turning operation of the other end o f the workpiece WA(WB) held on the second spindle 2 and the turning operation of one end of the workpiece W held on the first spindle 2 are simultaneously performed in either of the A-type mode or the B-type mode. With these steps repeatedly performed, the simultaneous turning of the workpieces at the spindles 1 and 2 can be performed at many times in a continuous and unattended manner.

The above embodiment can be modified in various manners. For example, during t he turning operation of the workpiece on the side of the second spindle 2 which is performed simultaneously with the turning operation of the workpiece on the side of the first spindle 1, the moving speed of the second spindle 2 may be any number of times such as three, four or half times other than twice the moving speed of the tool rest. When twice the moving speed of the tool rest 10 is selected as in the above embodiment, the workpiece on the side of the first spindle 1 and the workpiece on the side of the second spindle 2 are turned to have configurations symmetrical with each other. When other number of times than twice is selected, the workpieces may be turned to have configurations non-symmetrical with each other.

In addition, although with the above embodiment, the product P has both ends turned in different turning modes or the A-type mode and the B-type mode, respectively, the present invention can be also applied to manufacture a product having both ends turned in the same turning mode or to manufacture a product with one end turned and with the other end not turned.

While the invention has been described with reference to a preferred embodiment thereof, it is to be understood that modifications or variations may be easily made without departing from the spirit of this invention which is defined by the appended claims.

What is claimed is:

1. A method of turning workpieces, comprising the steps of:

(a) holding a workpiece on a first spindle;

(b) rotating said first spindle and turning one end of said workpiece by a first tool in a first turning mode;

(c) feeding said workpiece toward a second spindle along an axis of said first spindle, said first spindle opposing the second spindle along the axis;

(d) holding said workpiece on both said first and said second spindles and cutting off said workpiece at a predetermined position between said first and said second spindles, so that a remaining part of said workpiece is held on said first spindle as a first workpiece and that a cut part of said workpiece is held on said second spindle as a second workpiece that has one end turned in the first turning mode;

(e) rotating said first spindle and moving a tool rest for turning a first end of said first workpiece by a first tool in a second turning mode;

(f) rotating said second spindle and moving said second spindle in synchronism with the movement of said tool rest for turning a second end of said second workpiece by a second tool in said second turning mode at the same time that said first end of the first workpiece is turned in said second turning mode so that said second workpiece has the first and the second end turned in said first turning mode and in said second turning mode, respectively, said first tool and said second tool being disposed on the tool rest;

(g) removing said second workpiece from said second spindle;

(h) repeating the steps (c) to (g) with said second turning mode in the steps (e) and (f) replaced by said first turning mode.

2. The method according to claim 1 wherein said step (f) further comprises holding said first tool and said second tool in position relative to each other.

3. The method according to claim 2 wherein said second turning mode in said step (e) further comprises a mode for forming a curved cut surface;

each of said steps (b) and (e) comprises rotating said first spindle about a Y-axis;

said step (e) further comprises rotating said second spindle about said Y-axis, and moving said tool rest both in a Z-axis and an X-axis, said Z-axis being parallel to said Y-axis, and said X-axis being perpendicular to said Z-axis; and said step (f) further comprises moving said second spindle along only said Y-axis.

4. The method according to claim 3 wherein said step (f) further comprises moving said second spindle along said Y-axis at a speed twice the moving speed of said tool rest along said Z-axis.

* * * * *